(12) United States Patent
Palanki et al.

(10) Patent No.: US 8,737,296 B2
(45) Date of Patent: May 27, 2014

(54) METHOD AND APPARATUS FOR ANCHOR CELL DESIGNATION IN NETWORK MIMO

(75) Inventors: Ravi Palanki, San Diego, CA (US); Alexei Y. Gorokhov, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1003 days.

(21) Appl. No.: 12/603,397

(22) Filed: Oct. 21, 2009

(65) Prior Publication Data

US 2010/0103821 A1  Apr. 29, 2010

Related U.S. Application Data

(60) Provisional application No. 61/108,297, filed on Oct. 24, 2008.

(51) Int. Cl.
*H04W 4/00* (2009.01)

(52) U.S. Cl.
USPC .......................................................... 370/328

(58) Field of Classification Search
USPC ........ 370/310–350; 455/422.1, 434, 436–444
See application file for complete search history.

(56) References Cited

U.S. PATENT DOCUMENTS

| | | | | |
|---|---|---|---|---|
| 5,787,348 | A * | 7/1998 | Willey et al. ................... | 455/441 |
| RE36,309 | E * | 9/1999 | Kanai et al. ..................... | 370/331 |
| 6,400,954 | B1 * | 6/2002 | Khan et al. ...................... | 455/450 |
| 6,658,269 | B1 * | 12/2003 | Golemon et al. ........... | 455/562.1 |
| 6,862,274 | B1 * | 3/2005 | Tsao et al. ...................... | 370/338 |
| 2001/0040881 | A1 * | 11/2001 | Ayyagari et al. ............... | 370/342 |
| 2002/0015393 | A1 * | 2/2002 | Pan et al. ........................ | 370/335 |
| 2004/0229624 | A1 | 11/2004 | Cai et al. | |
| 2005/0232227 | A1 | 10/2005 | Jorgenson et al. | |
| 2007/0207812 | A1 | 9/2007 | Borran et al. | |
| 2008/0102784 | A1 * | 5/2008 | Mittal et al. ................ | 455/404.1 |
| 2008/0182579 | A1 * | 7/2008 | Wang et al. .................... | 455/436 |

FOREIGN PATENT DOCUMENTS

| | | |
|---|---|---|
| CN | 1949678 A | 4/2007 |
| WO | 2008042889 A1 | 4/2008 |

OTHER PUBLICATIONS

Motorola. "LTE-A Multiple Point Coordination and Its Classification" 3GPP TSG-RAN WG1 #54, R1-083229; Jeju, South Korea, Aug. 18-22, 2008.*

International Search Report—PCT/US2009/061726—International Search Authority, European Patent Office, Apr. 8, 2010.

Ericsson: "LTE-Advanced—Coordinated Multipoint transmission/reception," 3GPP Draft TSG-RAN WG1 #53bis, R1-082469; Warsaw, Poland, XP050110742, (Jun. 30, 2008).

(Continued)

*Primary Examiner* — Hassan Kizou
*Assistant Examiner* — Ashil Farahmand
(74) *Attorney, Agent, or Firm* — Dalei Dong

(57) ABSTRACT

Systems and methods that designate a control attachment point(s) during transmission of data in a Coordinated Multi-point (CoMP) system. The control attachment point is represented by an anchor cell to address control signaling and represent a User Equipment's (UE) interaction with the wireless communication system from a perspective of control (e.g., supplying/sending grants to the UE, transmitting/receiving ACKS on the downlink/uplink to the UE, control information (CQI), and the like.) The cells can further engage in backhaul transfer of information therebetween, and dynamic switching/change of anchor point based on criteria such as control loading, channel quality, and the like can further be implemented.

38 Claims, 12 Drawing Sheets

(56) References Cited

OTHER PUBLICATIONS

Huawei, et al: "CoMP clarification of definitions and TP" 3GPP Draft TSG RAN WG1#54bis, R1-083906; XP050317217, (Sep. 29, 2008).

Huawei: "System performance evaluation for uplink CoMP," 3GPP Draft TSG RAN WG1 Meeting #56bis; R1-091618; Seoul, Korea, (Mar. 23, 2009), XP050339161.
Taiwan Search Report—TW098136011—TIPO—Oct. 3, 2012.
Written Opinion—PCT/US2009/061726—ISA/EPO—Apr. 8, 2010.

* cited by examiner

METHOD AND APPARATUS FOR ANCHOR CELL DESIGNATION IN NETWORK MIMO

CLAIM OF PRIORITY UNDER 35 U.S.C. §119

The present Application for patent claims priority to Provisional Application No. 61/108,297 entitled "ANCHOR CELL FOR NETWORK MIMO" filed on 24 Oct. 2008, and assigned to the assignee hereof and hereby expressly incorporated by reference herein.

BACKGROUND

1. Field

The following description relates generally to wireless communications, and more particularly to control signaling in Coordinated Multipoint (CoMP) systems.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Heterogeneous wireless communication systems commonly can include various types of base stations, each of which can be associated with differing cell sizes. For instance, macro cell base stations typically leverage antenna(s) installed on masts, rooftops, other existing structures, or the like. Further, macro cell base stations oftentimes have power outputs on the order of tens of watts, and can provide coverage for large areas. The femto cell base station is another class of base station that has recently emerged. Femto cell base stations are commonly designed for residential or small business environments, and can provide wireless coverage to mobile devices using a wireless technology (e.g., 3GPP Universal Mobile Telecommunications System (UMTS) or Long Term Evolution (LTE), 1x Evolution-Data Optimized (1xEV-DO), . . . ) to communicate with the mobile devices and an existing broadband Internet connection (e.g., digital subscriber line (DSL), cable, . . . ) for backhaul. A femto cell base station can also be referred to as a Home Evolved Node B (HeNB), a Home Node B (HNB), a femto cell, or the like. Examples of other types of base stations include pico cell base stations, micro cell base stations, and so forth.

Moreover, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Further, in a multiple-in-multiple-out (MIMO) communication system, multiple sources and/or destinations (e.g., corresponding to respective antennas) can be utilized for the transmission and reception of data, control signaling, and/or other information between devices in the communication system. The use of multiple sources and/or destinations for respective transmissions in connection with a MIMO communication system has been shown to yield higher data rates, improved signal quality, and other such benefits over single-input and/or single-output communication systems in some cases. One example of a MIMO communication system is a Network MIMO (N-MIMO) or Coordinated Multipoint (CoMP) system, in which a plurality of cells can cooperate to exchange information with one or more receiving devices, such as user equipment units (UEs) or the like.

Mobile devices are typically able to detect presence of one or more proximate base stations of various types (e.g., macro cell, micro cell, femto cell, pico cell, . . . ). Moreover, a particular base station can be selected to be accessed by a given mobile device. In such system arrangements, management of control channel information can become complex.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the subject innovation provide for a control attachment point(s) during transmission of data in a Coordinated Multipoint (CoMP) system, via designating a cell(s) as an anchor cell(s). Such control attachment point enables the anchor cell, to address control signaling and represent a User Equipment's (UE) interaction with the wireless communication system from a perspective of control (e.g., supplying/sending grants to the UE, transmitting/receiving ACKS on the downlink/uplink to the UE, control information (CQI), and the like.) Hence, as opposed to merely transmitting/receiving data with high connectivity—the subject innovation enables a control attachment point that maintains high quality control connectivity, wherein the designated anchor cell in the uplink can be—different from—the anchor cell in the downlink. The downlink anchor cell represents the cell from which all DL control information (including grants and ACKs for uplink—UL—data) are sent. Likewise, the uplink anchor cell represents the cell to which the UE sends the uplink control channels (including CQI and ACKs for DL data).

Moreover, selection of the anchor cell can be based on criteria (e.g., a predetermined criteria) such as signal strength (e.g., designating a cell with the strongest signal as the anchor cell); existing or current load of control data (e.g., designating a cell that manages few best effort users—rather than another cell that manages a plurality of VOIP users that exchange a substantial amount of control data.) The UL anchor cell can further share relevant information (e.g. CQI, ACKs) sent by the UE with other cells over the backhaul, wherein the cells can jointly or separately determine a scheduling decision. As such, the scheduling decisions (e.g., power levels, beam directions, and the like) can be exchanged over the backhaul.

The DL anchor cell can further indicate the scheduled packet information (including beam directions from other cells if using CRS).

It is to be appreciated that other auxiliary cells can also monitor the UE control transmissions (e.g. UE ACK, acknowledgement message), and the anchor cells of the subject innovation does not preclude such monitoring. According to a particular aspect, one such over the air (OTA) monitoring can include a soft handoff scenario wherein UE ACK is monitored by two cells. In such a case, the ACK can be channelized based on a UE MACID such as the cell-Radio Network Temporary Identifier (c-RNTI) and a short c-RNTI that is negotiated between the cells. Such arrangement can further specify a predetermined set of resources, wherein the ACK is transmitted, rather than have it be channelized based on the actual assignment. Thus, the UL anchor cell or an auxiliary cell can monitor the uplink ACK even if it is unaware of the DL assignment (e.g., by negotiating the c-RNTI).

According to a further aspect, cooperative traffic transmission to UE (reception from UE)—via an anchor cell that is employed for signaling—enhances coverage/throughput, and further relaxes requirements on handoff agility, such as by mitigating handoff ping-pong with UE mobility at cell boundaries. For example, there no longer exists a requirement to rapidly switch a DL (UL) anchor cell as long as the current DL (UL) quality is adequate to close control channels—(e.g., traffic can be often served cooperatively and hence the strongest DL (UL) cell can be involved in the traffic transmission (reception) without being an anchor.) In addition, typically the DL (UL) anchor cell does not need to be one of the cells involved in traffic transmission (reception) at all times.

In a related aspect, when conditions of the UE in the wireless communication changes, another cell can be selected to represent the anchor cell (e.g., the predetermined criteria such as control load or signal strength can point to a different cell as being the best cell for purpose of control attachment)—wherein an associated hand off can occur from the initial anchor cell to another anchor cell. Such handing off can further exhibit a substantial high toleration of deep fade and its related time period. In one particular aspect, control considerations in handoff scenarios can predominate data considerations during the handoff. For example, requirements for a fast handoff in a fully coordinated transmission system can diminish, because multiple points are engaged in transmitting. Likewise, dynamic switching and change of anchor point based on criteria such as control loading, channel quality, and the like can be implemented.

According to related aspects, a method is described in conjunction with designation of a cell as an anchor point. Initially, criteria can be selected for designation of a cell as an anchor cell. Subsequently, a cell can be designated as the anchor cell based on satisfaction of the selected criteria. Accordingly, from perspective of control, a UE's interaction with the wireless communication system is facilitated (e.g., supplying/sending grants to the UE, transmitting/receiving ACKS on the downlink/uplink to the UE, control information—CQI—and the like.) Subsequently, the cells can further engage in backhaul transfer of information therebetween.

Another aspect relates to a wireless communications apparatus. The wireless communications apparatus can include at least one processor. The at least one processor can be configured to designate a cell(s) as an anchor cell in the UL or downlink (DL). Such at least one processor can further be configured to facilitate exchanging/sharing information sent by the UE with other cells over the backhaul, wherein the cells can jointly or separately determine a scheduling decision.

Yet another aspect of the subject innovation relates to a plurality of functional components for performing predetermined functions as part of a wireless communications apparatus. Such wireless communications apparatus can include means for designating a cell as an anchor cell. Moreover, the wireless communication system can include means for sharing information with other cells over the backhaul, to facilitate a joint or separate scheduling decision.

Still another aspect relates to a computer program product that can comprise a computer-readable medium. The computer-readable medium can include code for causing at least one computer to designate a cell as an anchor cell. The computer-readable medium can further include code for causing at least one computer to receive and/or facilitate sharing information over the backhaul, to derive efficient scheduling decisions.

According to a further aspect of the subject innovation, an apparatus is supplied that can include a designation component, which designates a cell as an anchor cell. Such designation component can employ predetermined criteria such as signal strength (e.g., designating a cell with the strongest signal as the anchor cell); existing load of control data (e.g., designating a cell that manages a few best effort users—rather than another cell that manages a plurality of VOIP users that exchange a substantial amount of control data), to select a cell as the anchor cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
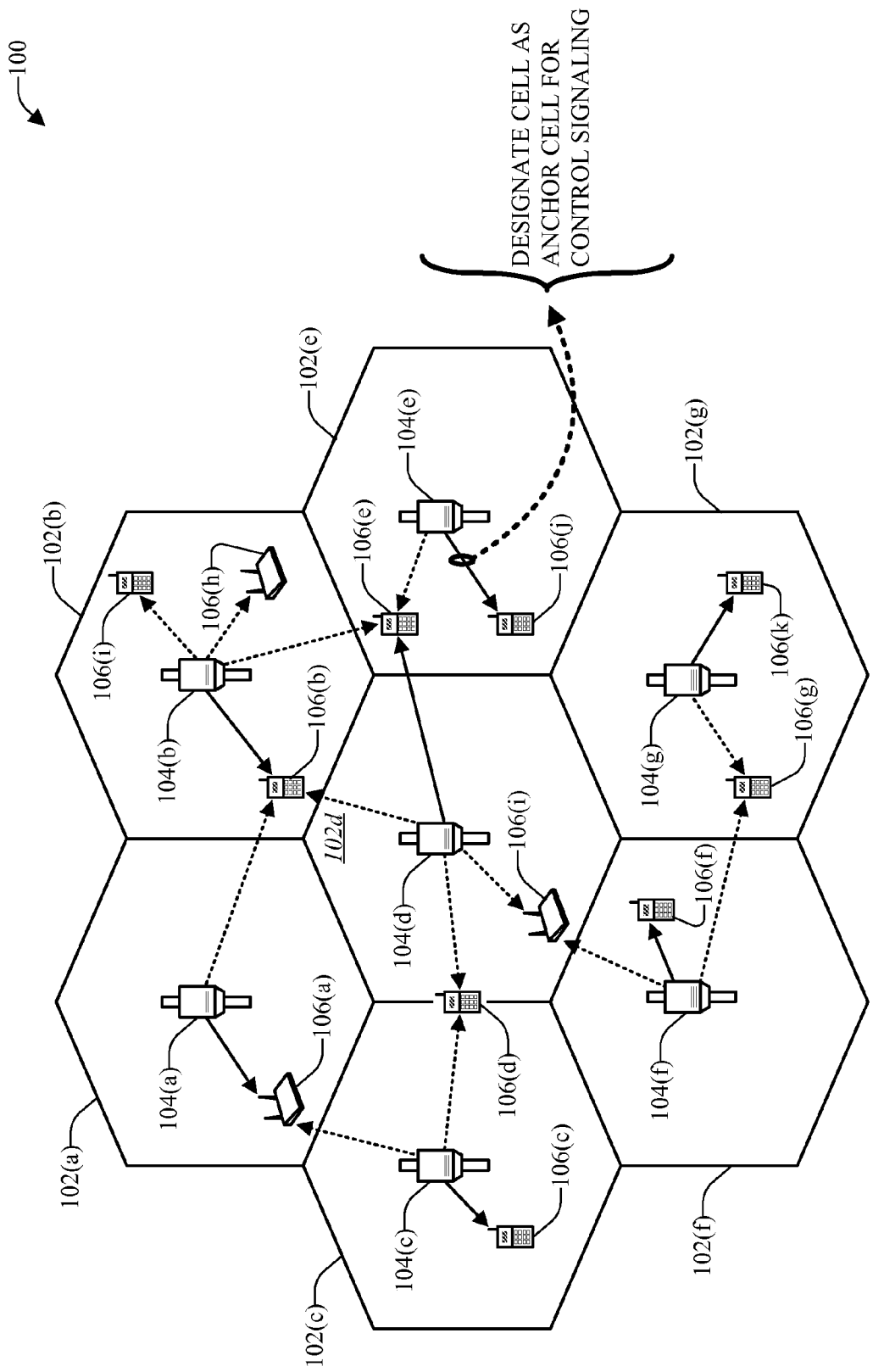
FIG. 1 is an illustration of a wireless communication system that can employ various aspects of the subject innovation.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), a femto cell, a pico cell, a micro cell, a macro cell, a Home Evolved Node B (HeNB), a Home Node B (HNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term apparatus as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

FIG. 1 illustrates an exemplary wireless communication system 100 configured to support a number of users, in which various aspects of the subject innovation for designating anchor cells can be implemented. System 100 provides communication for multiple cells 102, such as, for example, macro cells 102*a*-102*g*. Each macro cell 102*a*-102*g* is serviced by a corresponding access point 104 (such as access points 104*a*-104*g*). Each cell 102*a*-102*g* can further be divided into one or more sectors. Various devices 106 (including devices 106*a*-106*k*), are dispersed throughout system 100. Each device 106 may communicate with one or more access points 104 on a forward link (FL) or downlink (DL) and/or a reverse link (RL) or uplink (UL), at a given moment, depending upon whether device 106 is active and whether device 106 is in soft handoff, for example.

In such a system, CoMP Joint Processing represents a technique in which multiple cells jointly send packets using one or more layers to a UE. Moreover, wireless communication system 100 can provide service over a large geographic region, wherein, macro cells 102*a*-102*g* may cover a few blocks in a neighborhood while designating a cell(s) as an anchor point in the wireless communication system. Such designation as an anchor cell, provides for a control attachment point(s) during transmission of data in a Coordinated Multipoint (CoMP) system. Hence, the attachment point enables the anchor cell, to address control signaling and represent a User Equipment's (UE) interaction with the wireless communication system from a perspective of control (e.g., supplying/sending grants to the UE, transmitting/receiving ACKS on the downlink/uplink to the UE, control information (CQI), and the like.) Hence, as opposed to merely transmitting/receiving data with high connectivity—the subject innovation enables a control attachment point that maintains control connectivity, wherein the anchor cell in the uplink can be the same—or different, from the anchor cell in the downlink. The downlink anchor cell represents the cell from which all DL control information (including grants and ACKs for UL data) are sent. Likewise, the uplink anchor cell represents the cell to which the UE sends the uplink control channels (including CQI and ACKs for DL data).

Figure 2:
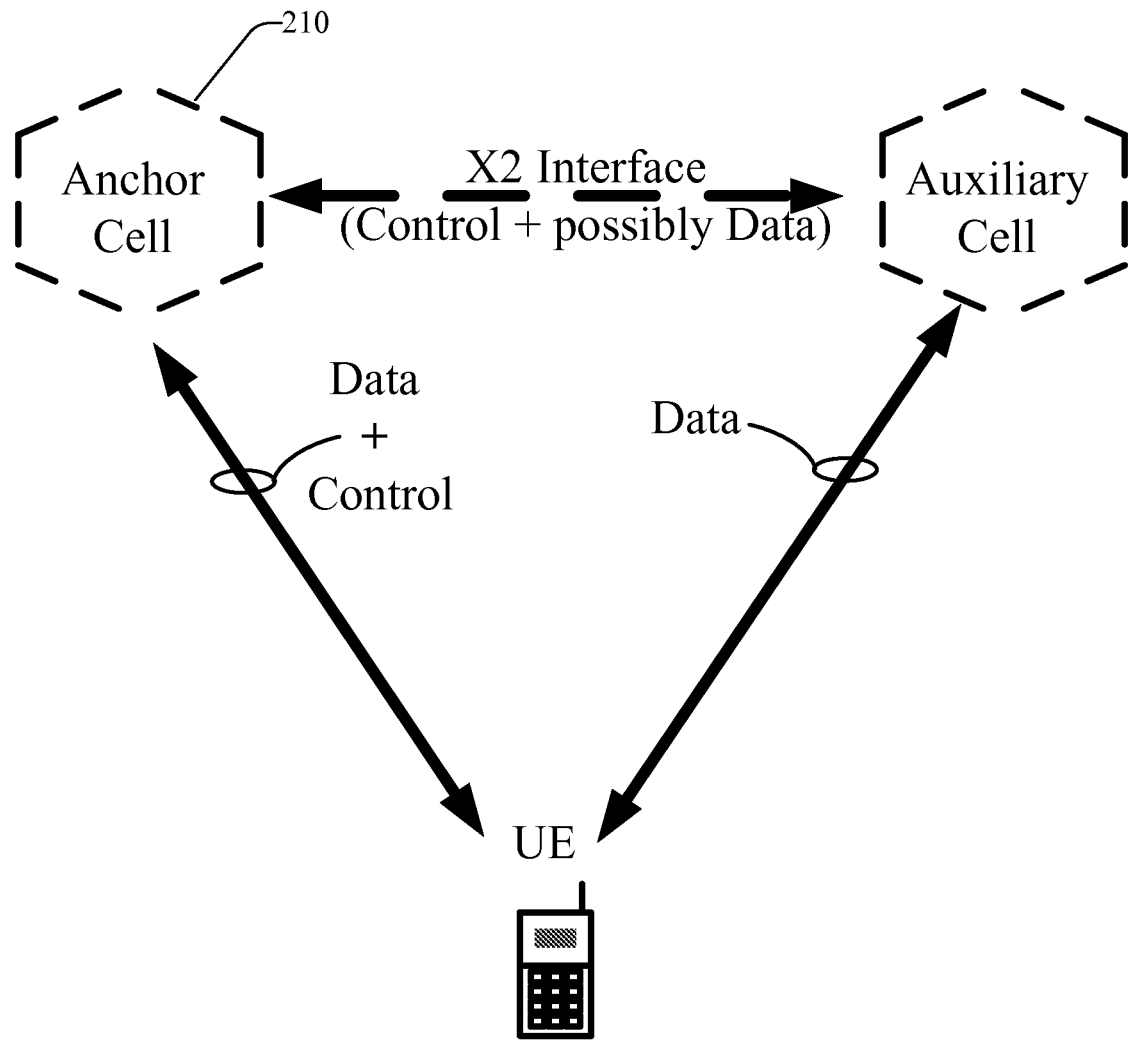
FIG. 2 illustrates a particular aspect for designation of a control attachment point(s) during transmission of data in a Coordinated Multipoint (CoMP) system.

FIG. 2 illustrates a particular aspect for designation of a control attachment point(s) during transmission of data in a Coordinated Multipoint (CoMP) system, via designating a cell(s) as an anchor cell(s) 210. Typically, in network MIMO (N-MIMO) joint processing schemes, different cells co-operate to transmit information to one or more receivers (UEs). For example, instead of cell 1 (not shown) transmitting a modulation symbol "x" to UE 1 and cell 2 transmitting a modulation symbol "y" to UE2, cell 1 may transmit ax+by, while cell 2 may transmit cx+dy. The coefficients a, b, c, d can be selected to optimize various metrics, such as the signal to noise ratio (SNR) of either user, system capacity, and the like.

Accordingly, in N-MIMO joint transmission, multiple packets are transmitted from multiple cells, which may or may not be part of the same NodeB. Conversely, on the uplink, packets from multiple UEs may be received jointly at multiple cells. Other schemes for network MIMO (CoMP) include distributed beamforming (which does not involve packet sharing). As explained earlier, a particular aspect of the subject innovation facilitates management of control channel information among different among the different NodeBs in N-MIMO (CoMP), via designating a cell to be represented as an anchor cell. Hence, cooperative traffic transmission to UE (reception from UE), is enhanced via such anchor cell during signaling. Moreover, requirements on handoff agility can be further relaxed, such as by mitigating handoff ping-pong with UE mobility at cell boundaries. For example, there no longer exists a requirement to rapidly switch a DL (UL) anchor cell as long as the current DL (UL) quality is adequate to close control channels—(e.g., traffic can be often served cooperatively and hence the strongest DL (UL) cell can be involved in the traffic transmission (reception) without being an anchor.) In addition, the DL (UL) anchor cell does not need to be one of the cells involved in traffic transmission (reception) at all times. It is to be appreciated that the anchor cell for downlink and uplink can coincide; or alternatively differ.

Figure 3:
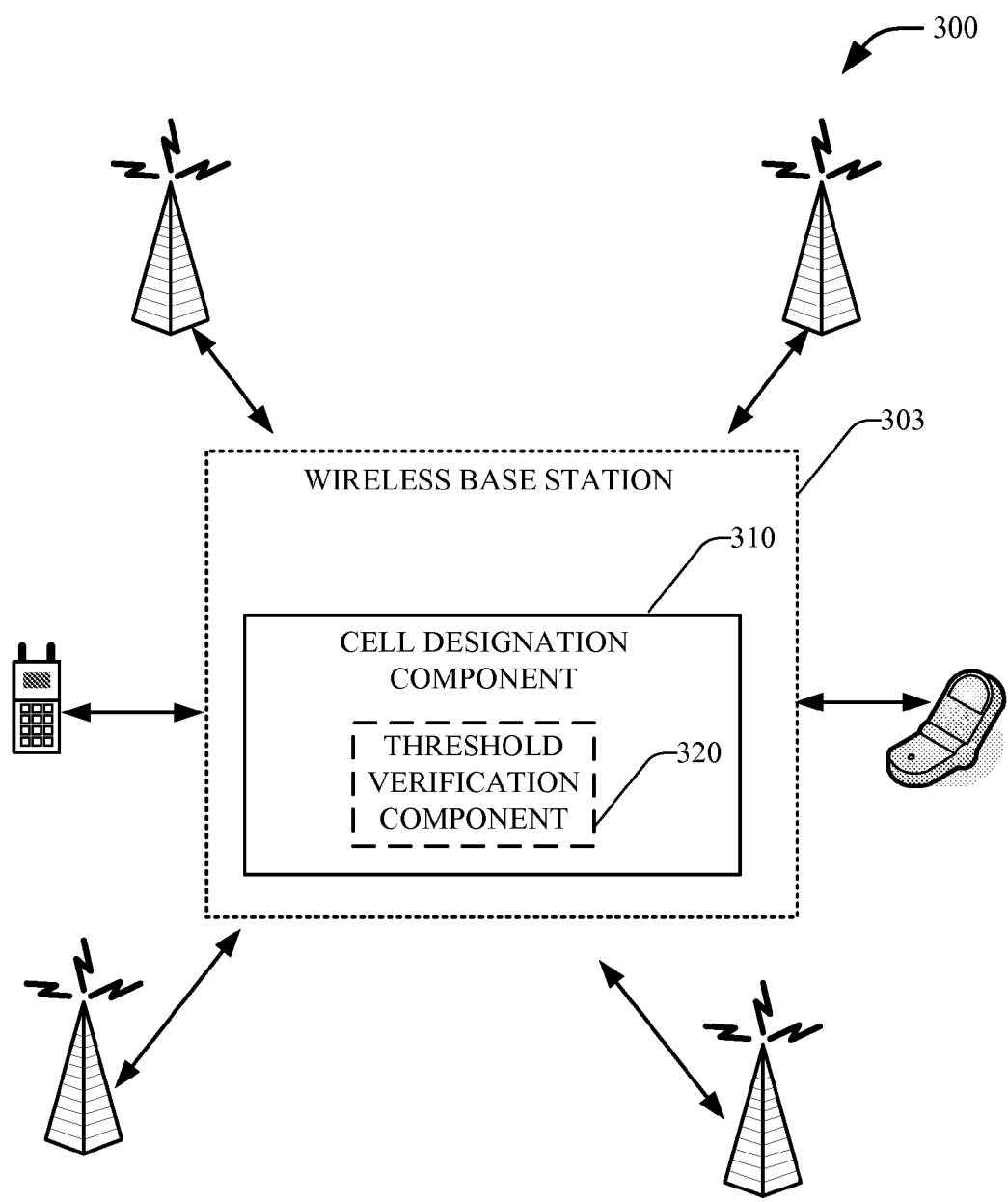
FIG. 3 illustrates a designation component that designates a cell as an anchor cell in accordance with an aspect of the subject innovation.

FIG. 3 illustrates an exemplary wireless base station 303 that includes a designation component 310, which designates a cell as an anchor cell in accordance with an aspect of the subject innovation. For example, the wireless base station 303 (e.g., eNB) can itself negotiate with other eNBs to determine whether it becomes the anchor cell for a UE. The selection of an anchor cell can be based on criteria such as signal strength (e.g., designating a cell with the strongest signal as the anchor cell); existing load of control data (e.g., designating a cell that manages a few best effort users—rather than another cell that manages a plurality of VOIP users that exchange a substantial amount of control data.) As such, a threshold verification component 320 that verifies whether values associated with the predetermined criteria has exceeded or has fallen below a predetermined threshold value, and if so a cell can be selected for designation as an anchor cell (e.g., the threshold defines the desired predetermined values). Such anchor cell can serve as an attachment point, to address control signaling and represent a User Equipment's (UE) interaction with the wireless communication system from a perspective of control (e.g., supplying/sending grants to the UE, transmitting/receiving ACKS on the downlink/uplink to the UE, control information (CQI), and the like.) The downlink anchor cell represents the cell from which all DL control information (including grants and ACKs for UL data) are sent. Likewise, the uplink anchor cell represents the cell to which the UE sends the uplink control channels (including CQI and ACKs for DL data). Moreover, the UL anchor cell can share relevant information (e.g. CQI, ACKs) sent by the UE with other cells over the backhaul, wherein the cells can jointly or separately determine a scheduling decision. In addition, scheduling decisions (e.g. power levels, beam directions and the like) can be exchanged over the backhaul. The DL anchor cell can indicate the scheduled packet information (including beam directions from other cells if using CRS). It is to be appreciated that in context of implementing CoMP scheduling with various aspects of the subject innovation, the scheduling entity(ies) for DL/UL may or may not be co-located within the respective anchors. For example, DL scheduler of a UE may be co-located with its DL anchor (and hence change dynamically upon channel conditions)—or alternatively be a separate network entity (box) that changes (semi-) statically.

It is further to be appreciated that other auxiliary cells can also monitor the UE control transmissions (e.g. UE ACK), and employing the anchor cell(s) of the subject innovation does not preclude such monitoring. According to a particular aspect, one such OTA monitoring can include a soft handoff case, wherein UE ACK is monitored by two cells. In such scenario, the ACK can be channelized based on a UE MACID such as the c-RNTI (e.g., a c-RNTI based acknowledgement) and a short c-RNTI that is negotiated between the cells. Such an arrangement can further specify a predetermined set of resources where the ACK is transmitted, rather than have it be channelized based on the actual assignment. Thus, the UL anchor cell or an auxiliary cell can monitor the uplink ACK even if it is unaware of the DL assignment.

Figure 4:
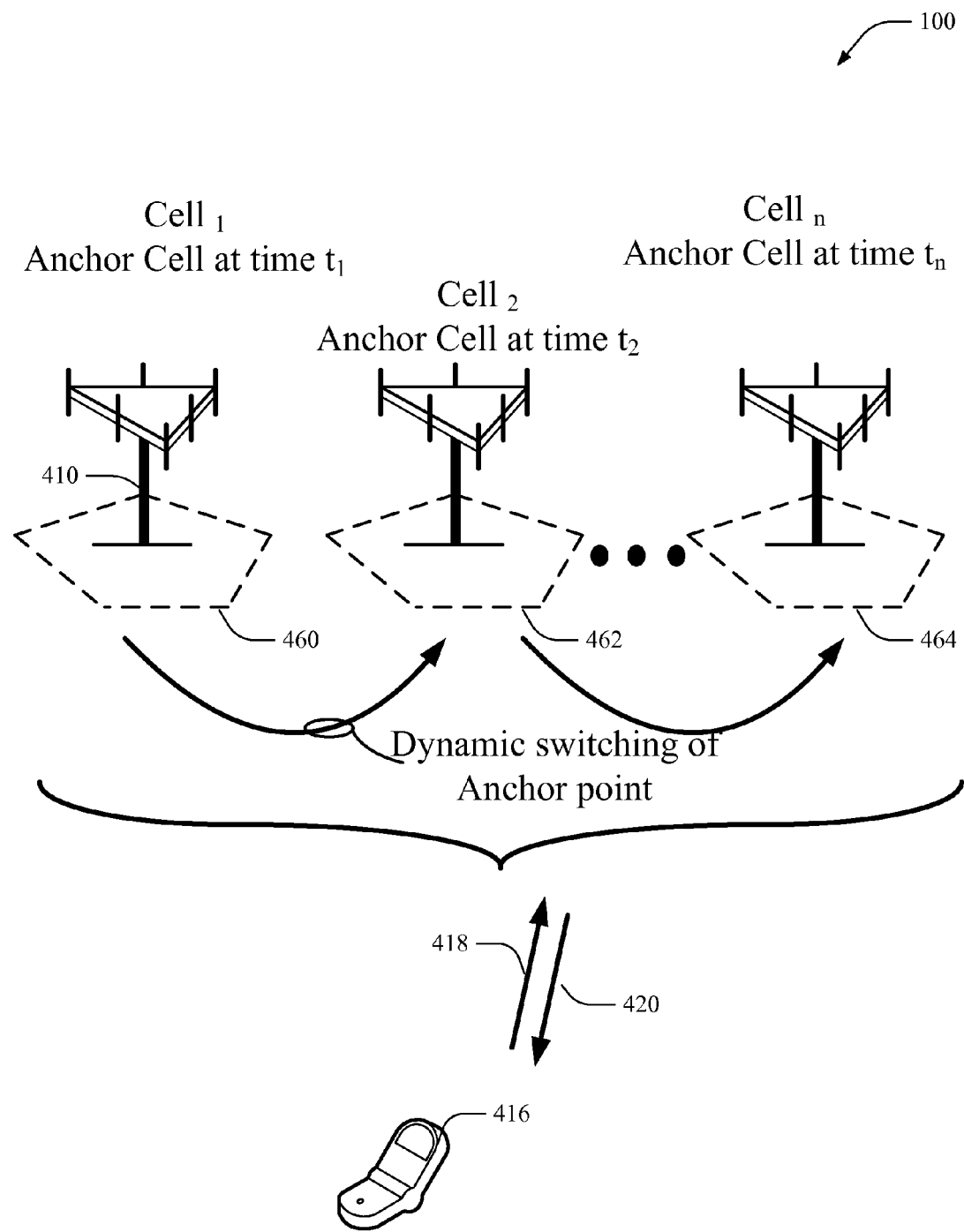
FIG. 4 illustrates a dynamic switching and change of a designated anchor point among cells based on predetermined criteria.

FIG. 4 illustrates a dynamic switching and change of a designated anchor point among cells 460 (410), 462 464 based on criteria such as control loading, channel quality, and the like. As such, when conditions of the UE 416 in the wireless communication changes, another cell can be selected to represent the anchor cell (e.g., the predetermined criteria such as control load or signal strength can point to a different cell as being the best cell for purpose of control attachment)—wherein an associated handoff occurs from the initial cell (being designated as an anchor cell) to the subsequent cell that becomes the new anchor cell. Such handoff can further exhibit a substantial high tolerance with respect to a deep fade and its related time period. In one particular aspect, control considerations in handoff scenarios can predominate data considerations during the handoff. For example, requirements for a fast handoff in a fully coordinated transmission system can diminish, because multiple points are engaged in transmitting. Moreover, dynamic switching and change of anchor point based on criteria such as control loading, channel quality, and the like can be implemented.

As illustrated, the system 400 can include one or more network cells (e.g., Node Bs, Evolved Node Bs (eNBs), base stations, access points, etc.) 410, which can communicate with respective user equipment units (UEs, also referred to as mobile stations, terminals, user devices, etc.) 416. In one example, respective cells 410, can correspond to and/or provide communication coverage for any suitable coverage area, such as an area associated with a macro cell, a femto cell (e.g., an access point base station or Home Node B (HNB)), and/or any other suitable type of coverage area.

In accordance with one aspect, a given UE 416 can communicate with any suitable number of network cells 410. For example, the UE 416 can conduct one or more uplink (UL, also referred to as reverse link (RL)) 418 communications to a cell 410, and respective cells can conduct one or more downlink (DL, also referred to as forward link (FL)) 420 communications to the UE 416. In one example, system 400 can utilize one or more network multiple-in-multiple-out (Network MIMO or N-MIMO), cooperative multipoint (CoMP), and/or other techniques, by which a single UE 416 is enabled to communicate with a plurality of disparate cells (410) 460 and/or sectors thereof. Additionally or alternatively, communication between a cell (410) 460 and a UE 416 can result in a strong dominant interference to other nearby cells (410) 460 and/or UEs 416. For example, if a UE 416 is located at the edge of an area corresponding to a cell (410) 460 serving the UE 416, communication between the UE 416 and its serving cell can cause interference to one or more other cells 410 within range of the UE 416 with which the UE 416 is not communicating under various circumstances. This can occur, for example, in a system that includes femto cells if a UE 416 is located within the coverage area of a femto cell, which in turn is embedded into the coverage area of a macro cell.

In accordance with another aspect, respective cells 416 in system 400 can coordinate pursuant to one or more cooperation strategies in order to increase data rates associated with communication with a given UE 416 and/or to reduce interference caused to other cells 410 and/or UEs in system 400. In one example, respective cells 410, 460 in system 400 can be operable to utilize a plurality of cooperation techniques for transmission to one or more UEs 416, such as coordinated silencing (CS), joint transmission (JT) via inter-eNodeB (inter-cell) packet sharing, coordinated beamforming (CBF), and/or any other suitable cell cooperation technique(s) as generally known in the art. In another example, various operational aspects of system 400 such as respective cell cooperation techniques, can be utilized for communication, based on various cooperation techniques—wherein respective UEs 416 can further be served via cooperative communication, which can be based at least in part on marginal utility calculations performed by one or more cells 410 (e.g., via a utility computation module—not shown) and/or any other suitable metric.

In one example, utility associated with a given UE 416 can be defined in terms of channel quality, user priority level, or the like. In accordance with one aspect, utility computation module (not shown) can compute one or more channel quality metrics for a given UE 416 by estimating and/or otherwise assessing a channel component and an interference component of respective signals observed by the UE 416. For example, information relating to channel quality and/or interference levels observed by a UE 416 can be reported from the UE 416 to a computing cell via a channel/interference feedback module and/or any other suitable means.

Figure 5:
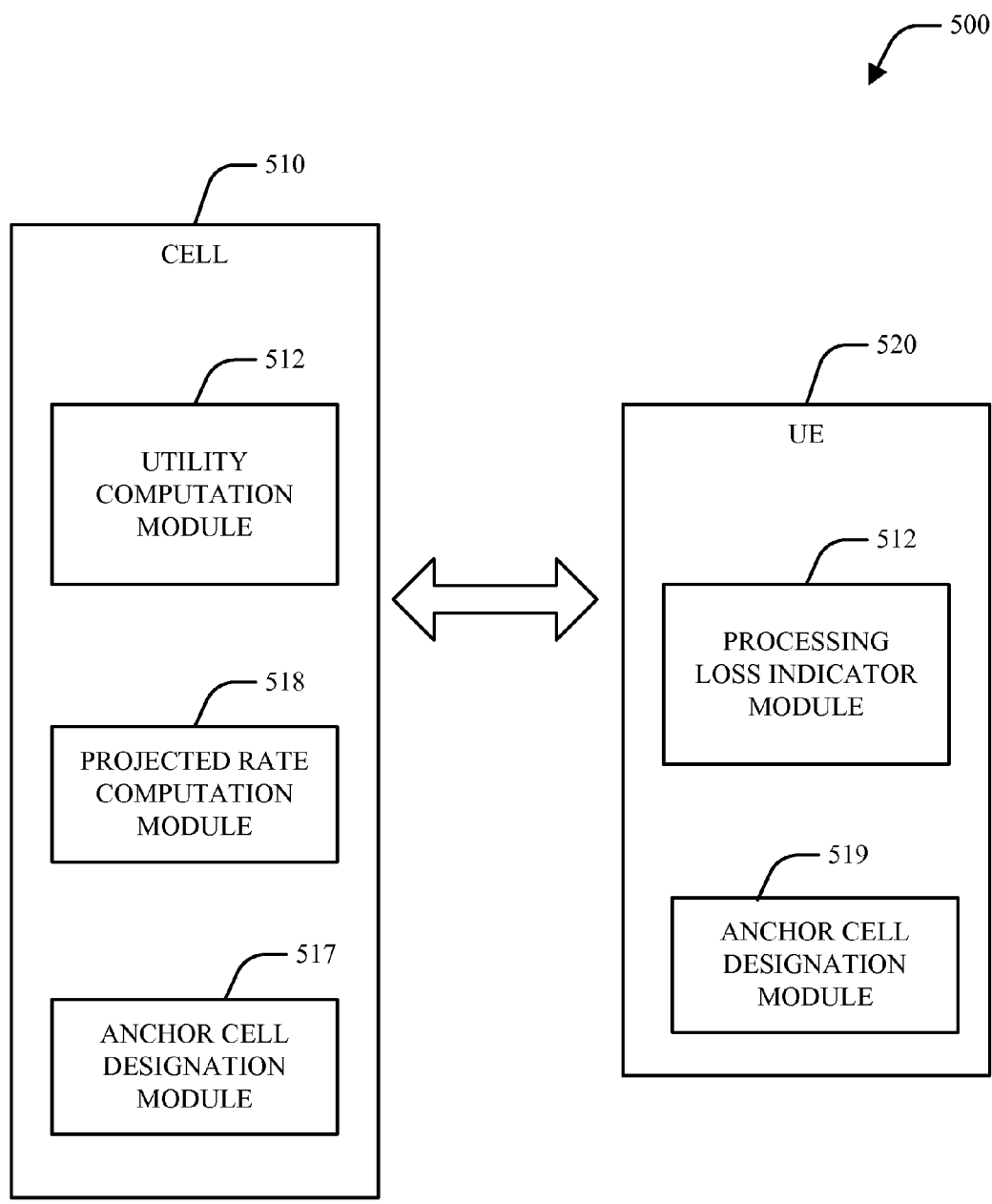
FIG. 5 illustrates a particular Coordinated Multipoint (CoMP) system operation, with cooperating cells that can be employed in conjunction with designating a cell as an anchor cell.

FIG. 5 illustrates a particular Coordinated Multipoint (CoMP) system operation, which can be employed in conjunction with designating a cell as an anchor cell. Typically, in conventional systems involving a single cell communicating with a UE, CQI information is generally reported from the UE to the cell as a maximum supportable data rate as opposed to interference parameters for respective non-serving cells. However, such a generalized report does not provide information regarding processing loss incurred by the UE as a result of, for example, channel implementations utilized by the UE, soft decoding techniques leveraged by the UE, or other such causes. Instead, such processing or implementation loss is absorbed into the generalized CQI reports provided by the UE. Furthermore, the processing loss associated with a given UE does not scale for N-MIMO communication (e.g., for an increasing number of serving cells), as strategy selection is generally performed by the network In contrast and in the context of N-MIMO or CoMP communication, one or more cells 510 associated with a given UE 520 can facilitate selection of respective cells 510 to be involved in a given communication with the UE 520, and as a result channel information and interference can be observed at the UE 520 from a plurality of different cells 510. Subsequently, carrier and interference estimates corresponding to various cells 510 and corresponding UEs 520 can be obtained, which can be leveraged by a projected rate computation module 518 that maps respective UEs 520, to projected data rates. Accordingly, the projected rate computation module 518 can utilize information relating to processing loss of various UEs 520 to facilitate determining per-user data rates corresponding to respective UEs 520, for example.

Likewise, respective cell cooperation techniques to be utilized for communication, can be based at least in part on marginal utility calculations performed by the utility computation module 512.

Moreover, information relating to user processing or implementation loss can be supplied to projected rate computation module 518 and/or utility computation module 512. For example, processing loss can be defined as a UE-specific parameter, which can further be provided as feedback from respective UEs 520 via an associated processing loss indicator module 512. Thus, for example, UE 520 can be configured to provide long-form feedback to cell 510 that includes one or more bits relating to a processing loss associated with UE 520 (e.g., in dB and/or any other suitable unit(s)) via processing loss indicator module 512, such that the processing loss information can subsequently be employed by cell 510 in performing scheduling decisions. As another example, a maximum processing loss can be defined within system 500 for respective UEs and/or groups of UEs (e.g., per UE category) via a minimum performance specification (MPS) for system 500. Accordingly, a maximum processing loss obtained in such manner can serve as a limit on processing loss reported by a given UE 520, or alternatively a maximum processing loss defined for a given UE 520 or UE category to which the UE 520 belongs can be utilized by projected rate computation module 518 as a default or assumed processing loss for the UE 520 in performing projected rate calculation. As explained earlier, the anchor cell designation modules 517, 519 (e.g., part of the UE 520 and/or cell 510), can address control signaling—and represent a User Equipment's (UE) interaction with the wireless communication system from a perspective of control (e.g., supplying/sending grants to the UE, transmitting/receiving ACKS on the downlink/uplink to the UE, control information (CQI), and the like.) As such, in contrast to merely transmitting/receiving data with high connectivity—the anchor cell designation module 517, 519 enable a control attachment point that maintains high quality control connectivity, wherein the anchor cell in the uplink can be the same—or different, from the anchor cell in the downlink.

Figure 6:
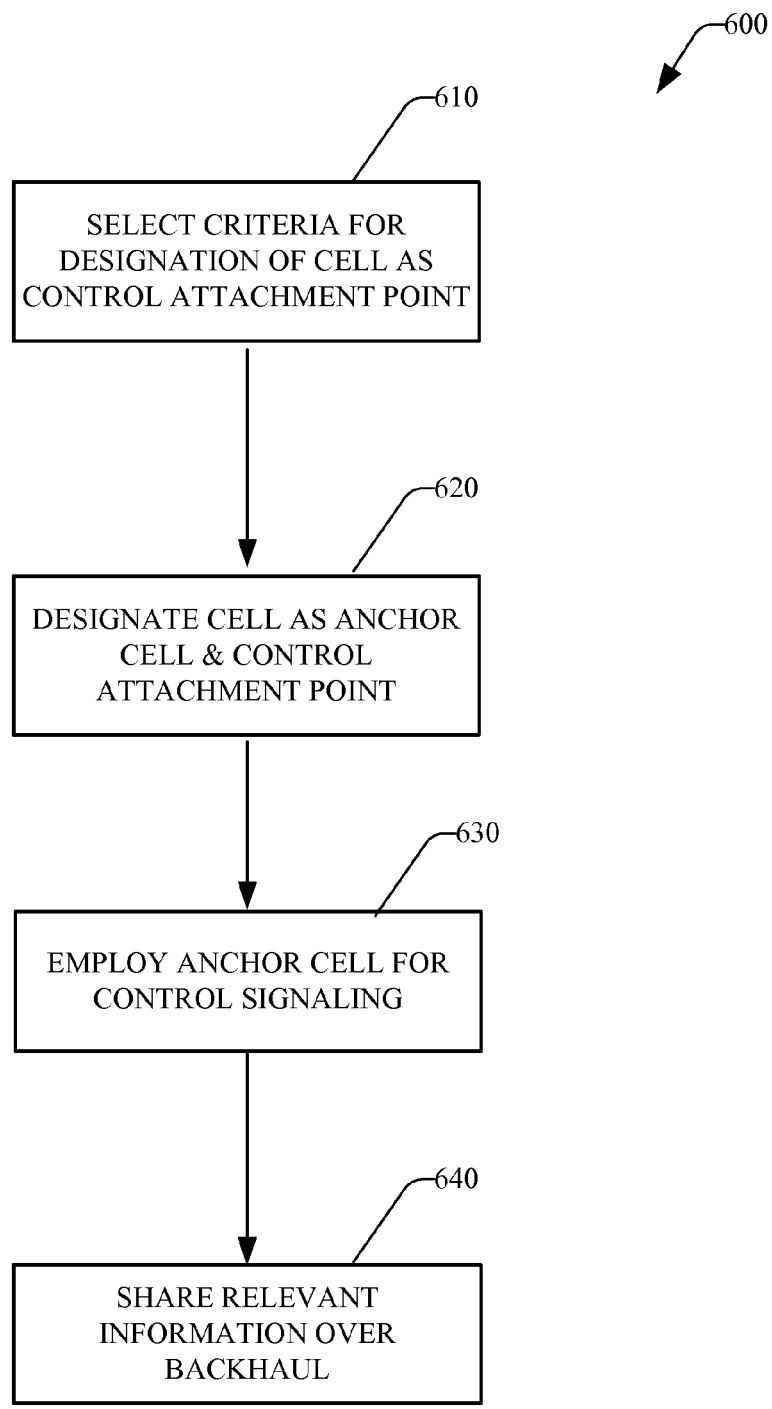
FIG. 6 illustrates a related methodology of designating an anchor cell according to an aspect of the subject innovation.

FIG. 6 illustrates a related methodology 600 of designating an anchor cell according to an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Initially, and at 610 a criteria can be defined and/or selected for designation of a cell as a control attachment point. For example, such criteria can be based on signal strength (e.g., designating a cell with the strongest signal as the anchor cell); existing load of control data (e.g., designating a cell that manages a few best effort users—rather than another cell that manages a plurality of VOIP users that exchange a substantial amount of control data.) Subsequently, and at 620 a cell can be designated as an anchor cell and as a control attachment point. Put differently, such control attachment point enables the anchor cell, to address control signaling and represent a User Equipment's (UE) interaction with the wireless communication system from a perspective of control at 630 (e.g., supplying/sending grants to the UE, transmitting/receiving ACKS on the downlink/uplink to the UE, control information (CQI), and the like.) Next and at 640, the UL anchor cell can share relevant information (e.g. CQI, ACKs) sent by the UE with other cells over the backhaul, wherein the cells can jointly or separately determine a scheduling decision. The scheduling decisions (e.g., power levels, beam directions etc.) can be exchanged over the backhaul at 640. The DL anchor cell can indicate the scheduled packet information (including beam directions from other cells if using CRS).

Figure 7:
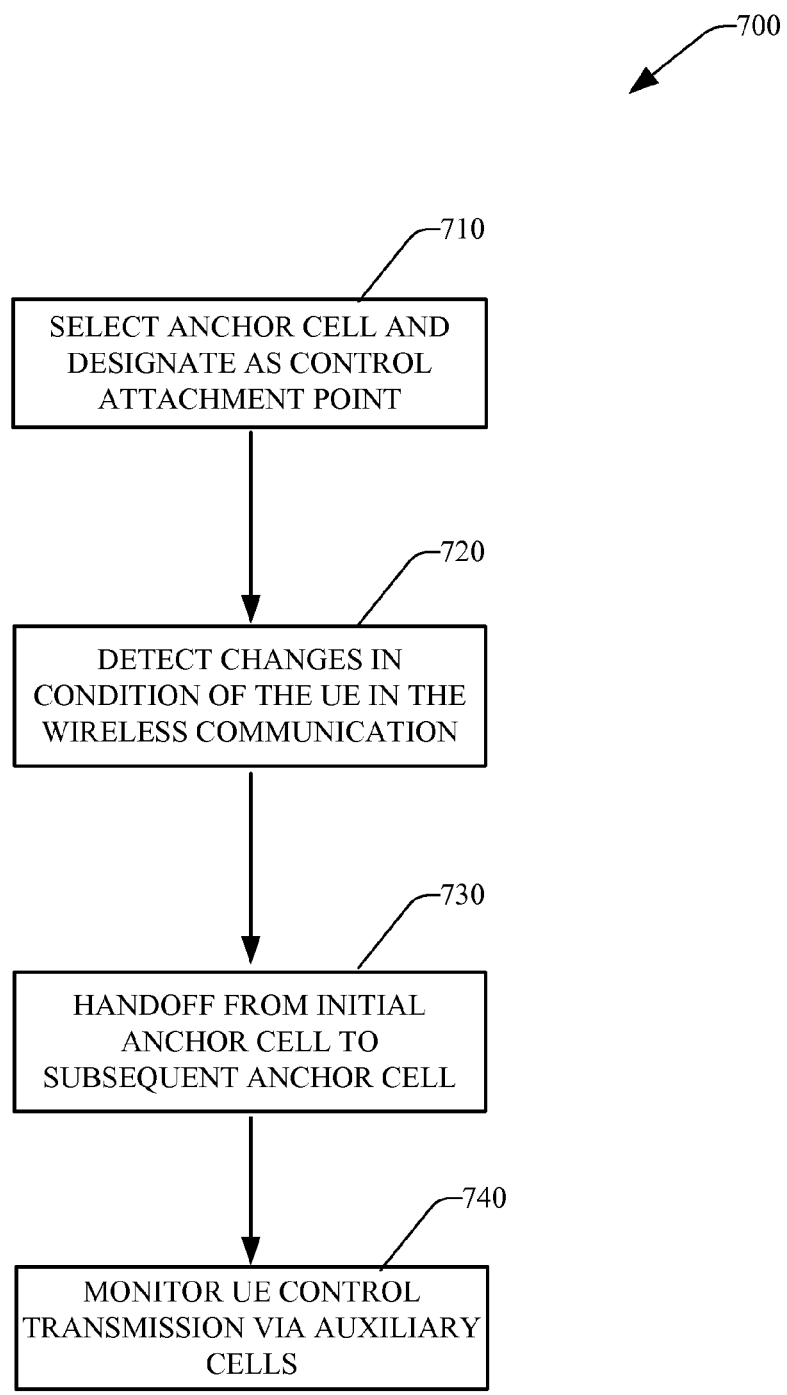
FIG. 7 illustrates a related methodology of dynamically switching a control attachment point from one cell to another cell in accordance with a particular aspect of subject innovation.

FIG. 7 illustrates a related methodology 700 of dynamically switching a control attachment point from one cell to another cell in accordance with an aspect of subject innovation. Initially, and at 710 an anchor cell can be selected and designated as control attachment point. Subsequently and at 720, when conditions of the UE in the wireless communication changes, another cell can be selected to represent the anchor cell (e.g., the predetermined criteria such as control load or signal strength can point to a different cell as being the best cell for purpose of control attachment), wherein an associated hand off occurs from the initial anchor cell to the subsequent anchor cell at 730. Such handoff can further exhibit a substantial high toleration of deep fade and its related time period. Hence, dynamic switching and change of anchor point based on criteria such as control loading, channel quality, and the like can be implemented. Moreover, and as indicated at 740 other auxiliary cells can also monitor the UE control transmissions (e.g. UE ACK), and employing the anchor cells of the subject innovation does not preclude such monitoring. For example, one such OTA monitoring can include a soft handoff case wherein UE ACK is monitored by two cells. In such a case, the ACK can be channelized based on a UE MACID such as the c-RNTI and a short c-RNTI that is negotiated between the cells. Such an arrangement can further specify a predetermined set of resources where the ACK is transmitted, rather than have it be channelized based on the actual assignment. Thus, the UL anchor cell or an auxiliary cell can monitor the uplink ACK even if it is unaware of the DL assignment.

Figure 8:
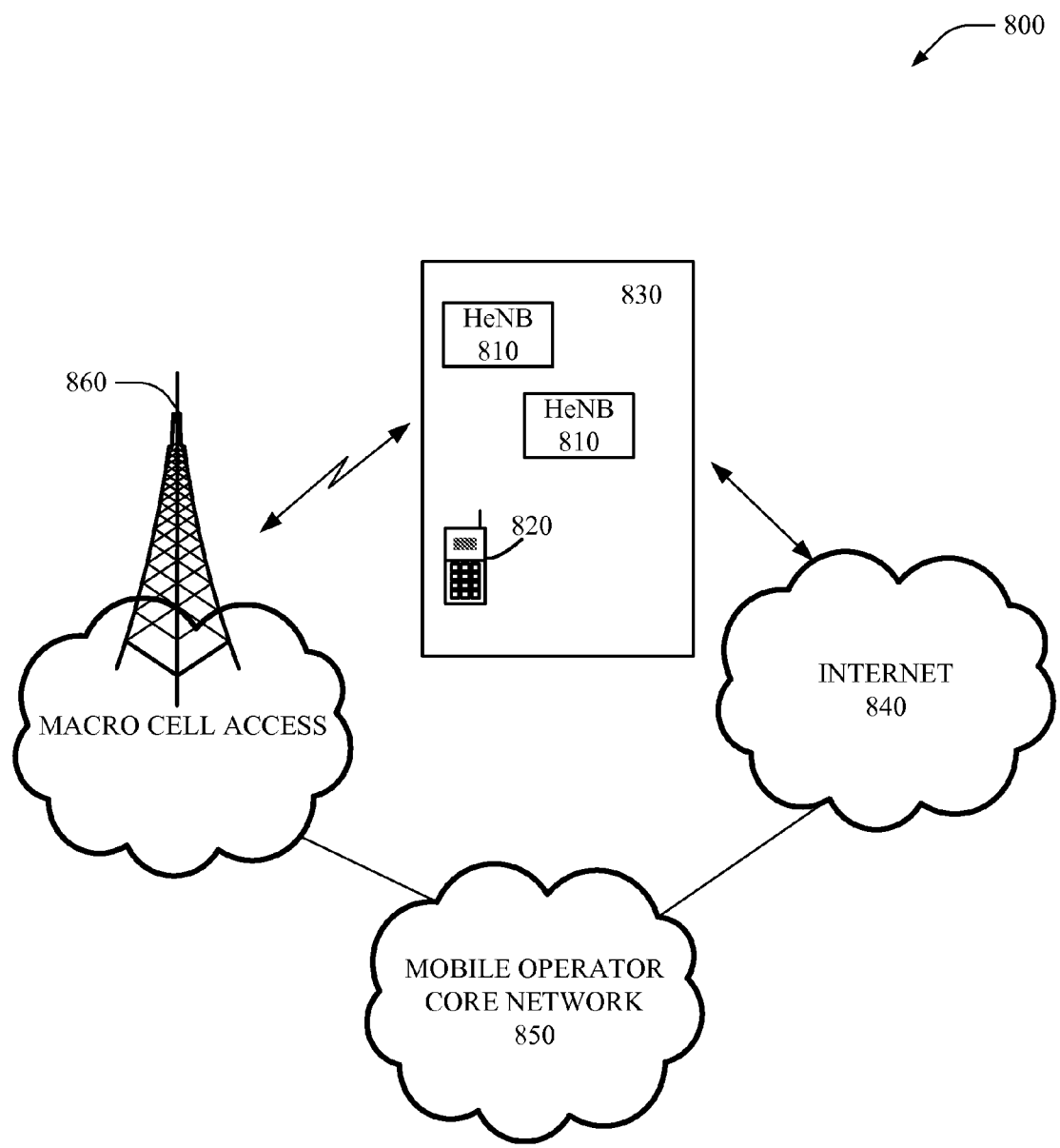
FIG. 8 illustrates an exemplary communication system that can employ a control attachment point(s) during transmission of data in a Coordinated Multipoint (CoMP) system, via designating a cell(s) as an anchor cell(s).

FIG. 8 illustrates an exemplary communication system 800 that can employ a control attachment point(s) during transmission of data in a Coordinated Multipoint (CoMP) system, via designating a cell(s) as an anchor cell(s). Such an attachment point designates the anchor cell, to address control signaling and represent a User Equipment's (UE) interaction with the wireless communication system from a perspective of control (e.g., supplying/sending grants to the UE, transmitting/receiving ACKS on the downlink/uplink to the UE, control information (CQI), and the like.)

As shown in FIG. 8, system 800 can include multiple femto cell base stations, which can also be referred to as access point base stations, Home Evolved Node B units (HeNBs), Home Node B unit (HNB), femto cells, or the like. The femto cell base stations (HeNBs 810), for example, can each be installed in a corresponding small scale network environment, such as, for example, in one or more user residences 830, and can each be configured to serve associated, as well as alien, mobile device(s) 820. Each HeNB 810 can further be coupled to the Internet 840 and a mobile operator core network 850 via a DSL router (not shown) or, alternatively, a cable modem (not shown).

Although embodiments described herein use 3GPP terminology, it is to be understood that the embodiments may be applied to 3GPP (Re199, Re15, Re16, Re17) technology, as well as 3GPP2 (1xRTT, 1xEV-DO Re10, RevA, RevB) technology and other known and related technologies. In such embodiments described herein, the owner of HeNB 810 can subscribe to mobile service, such as, for example, 3G mobile service, offered through the mobile operator core network 850, and mobile device 820 can be capable to operate both in a macro cellular environment via a macro cell base station 860 and in a residential small scale network environment. The HeNB 810 can be backward compatible with any existing mobile device 820.

It is contemplated that HeNBs 810 can include CSG HeNB(s), hybrid HeNB(s), and/or open HeNB(s). HeNBs 810 can be selected as the control attachment point— wherein as opposed to merely transmitting/receiving data with high connectivity—the subject innovation enables a control attachment point that maintains high quality control connectivity. As explained earlier, the anchor cell in the uplink can be the same—or different, from the anchor cell in the downlink. The downlink anchor cell represents the cell from which all DL control information (including grants and ACKs for UL data) are sent. Likewise, the uplink anchor cell represents the cell to which the UE sends the uplink control channels (including CQI and ACKs for DL data).

Figure 9:
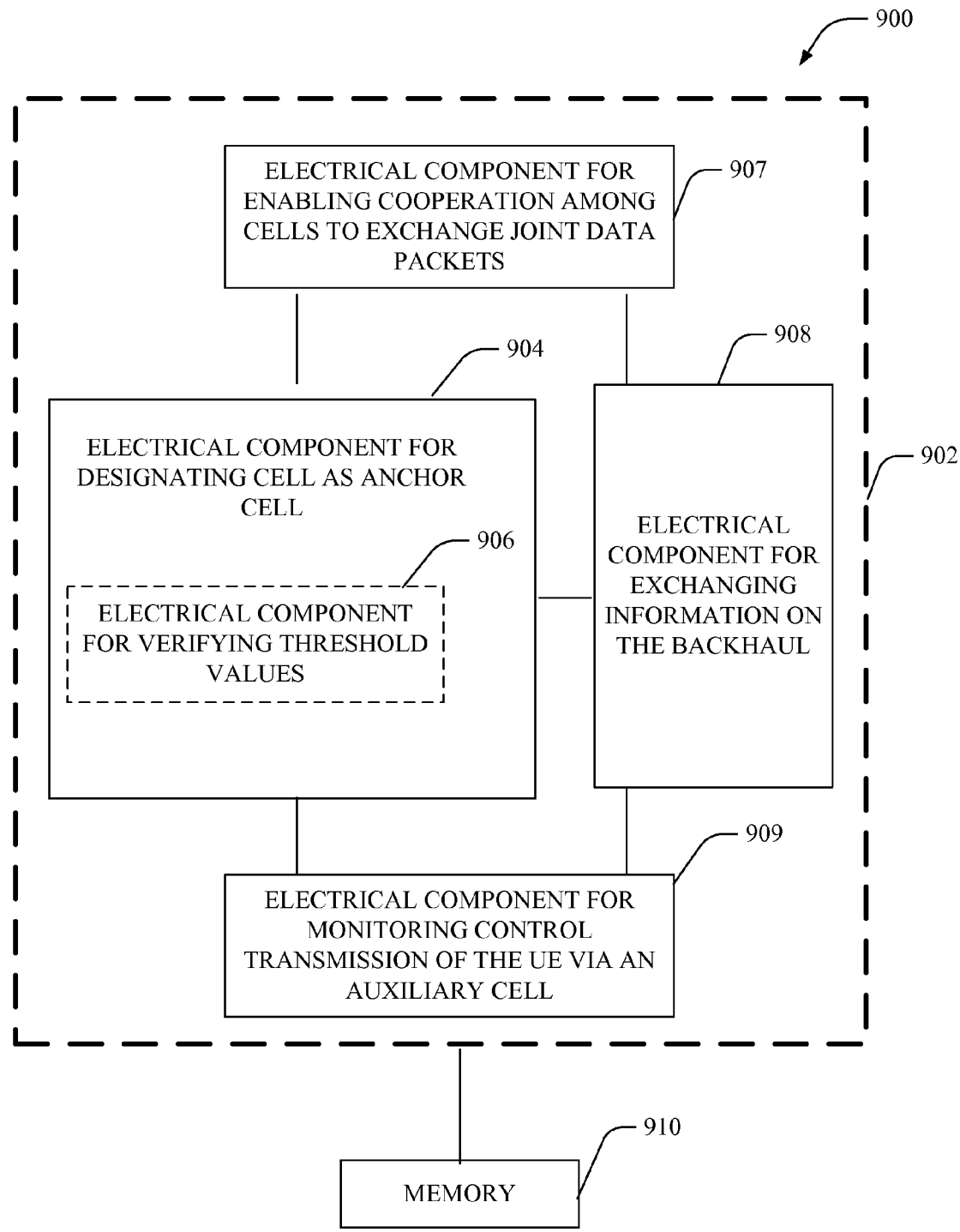
FIG. 9 illustrates a system that provides for a control attachment point(s) during transmission of data in a Coordinated Multipoint (CoMP) system.

FIG. 9 illustrates a system 900 (e.g., associated with a wireless communication apparatus), which provides for a control attachment point(s) during transmission of data in a Coordinated Multipoint (CoMP) system. Such an attachment point enables the anchor cell, to address control signaling and represent a User Equipment's (UE) interaction with the wireless communication system from a perspective of control (e.g., supplying/sending grants to the UE, transmitting/receiving ACKS on the downlink/uplink to the UE, control information—CQI—and the like.)

System 900 can reside at least partially within a base station, for instance. As depicted, system 900 includes functional blocks that can represent functions implemented by a processor, software, or combination thereof (e.g., firmware). System 900 includes a logical grouping 902 of electrical or electronic device or components that can act in conjunction. Logical grouping 904 can include an electrical component(s) for designating cell as an anchor cell (e.g., designating means). Such logical grouping further includes logical grouping 906 that includes electrical component(s) for verifying thresholds for designation of anchor cells based on a predetermined criteria (e.g., means for verifying satisfaction of threshold values). Likewise, logical grouping 908 includes an electrical component(s) for exchanging information among cells in backhaul (e.g., means for exchanging information.) In addition, logical grouping 907 includes an electrical component for enabling cooperation among cells to exchange joint data packets, as part of a CoMP wireless communication, for example (e.g., means for enabling cooperation among plurality of cells). Furthermore, logical grouping 909 includes an electrical component(s) for monitoring control transmission of the UE via an auxiliary cell (e.g., means for monitoring control transmission).

Moreover, logical grouping 902 can include a memory 910 that retains instructions for executing functions associated with electrical components 904, 906 and 908. While shown as being external to memory 910, it is to be understood that electrical components 904, 906, 907, 908, 909 can exist within memory 910.

Figure 10:
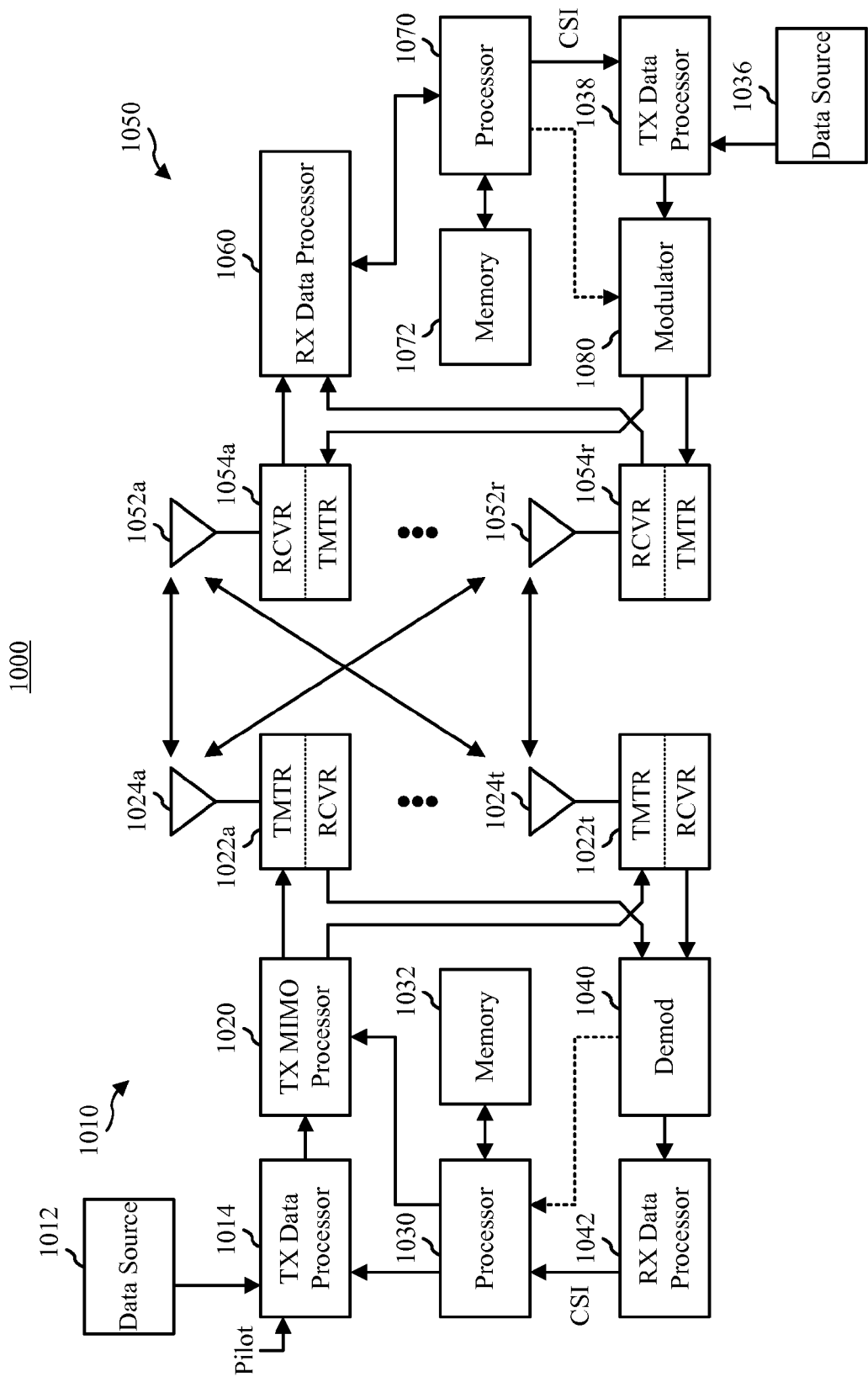
FIG. 10 illustrates an exemplary wireless communication system that can incorporate the control attachment point of the subject innovation.

FIG. 10 illustrates an exemplary wireless communication system 1000 that can incorporate the control attachment point of the subject innovation. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems and/or methods described herein to facilitate wireless communication therebetween.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antenna ports 1024a through 1024t, respectively.

At mobile device 1050, the transmitted modulated signals are received by $N_R$ antenna ports 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010. A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antenna ports 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

Figure 11:
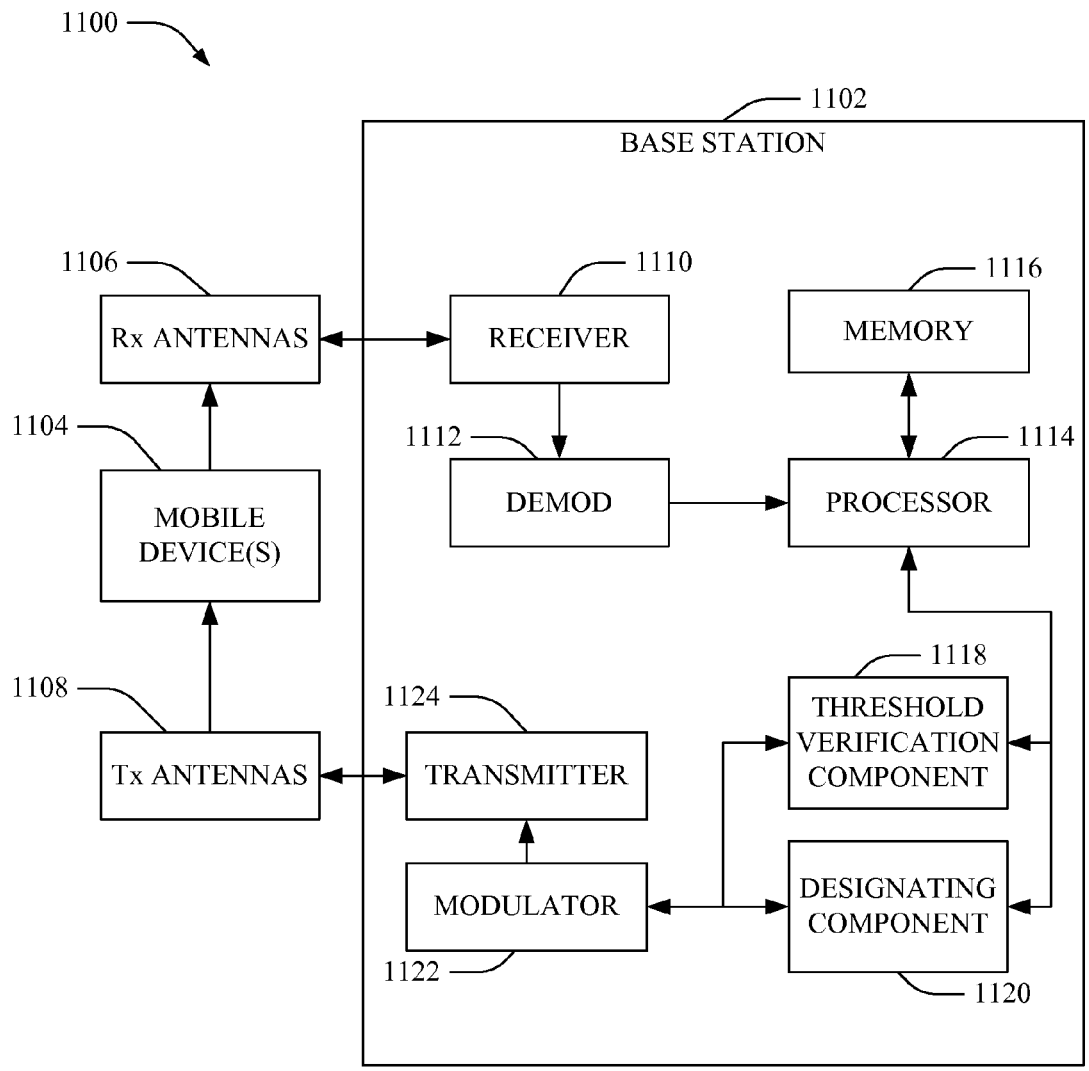
FIG. 11 is an illustration of a system that enables designating attachment points during transmission of data in a Coordinated Multipoint (CoMP) system.

FIG. 11 is an illustration of a system 1100 that enables designating attachment points during transmission of data in a Coordinated Multipoint (CoMP) system. System 1100 comprises a base station 1102 (e.g., access point, . . . ) with a receiver 1110 that receives signal(s) from one or more mobile devices 1104 through a plurality of receive antennas 1106, and a transmitter 1124 that transmits to the one or more mobile devices 1104 through a transmit antenna 1108. Receiver 1110 can receive information from receive antenna ports 1106 and is operatively associated with a demodulator 1112 that demodulates received information. Demodulated symbols are analyzed by a processor 1114 that can be similar to the processor described earlier, and which is coupled to a memory 1116 that stores data to be transmitted to or received from mobile device(s) 1104 and/or any other suitable information related to performing the various actions and functions set forth herein. Processor 1114 is further coupled to a designating component 1120 and a threshold verification component 1118. As explained earlier, the designating component 1120 designates the anchor cell, to address control signaling and represent a User Equipment's (UE) interaction with the wireless communication system from a perspective of control (e.g., supplying/sending grants to the UE, transmitting/receiving ACKS on the downlink/uplink to the UE, control information (CQI), and the like.) Likewise, the threshold verification component 1118 can verify if predetermine criteria for selection of the anchor cell (e.g., signal strength) has been met and/or there has been a change in conditions of the UE, and whether a change of condition associated with the anchor cell becomes necessary. The base station 1102 can further include a modulator 1122. Modulator 1122 can multiplex a frame for transmission by a transmitter 1124 through antennas 1108 to mobile device(s) 1104 in accordance with the aforementioned description. Although depicted as being separate from the processor 1114, it is to be appreciated that identity advertising component 1118, mode publicizing component 1120, and/or modulator 1122 can be part of processor 1114 or a number of processors (not shown).

Figure 12:
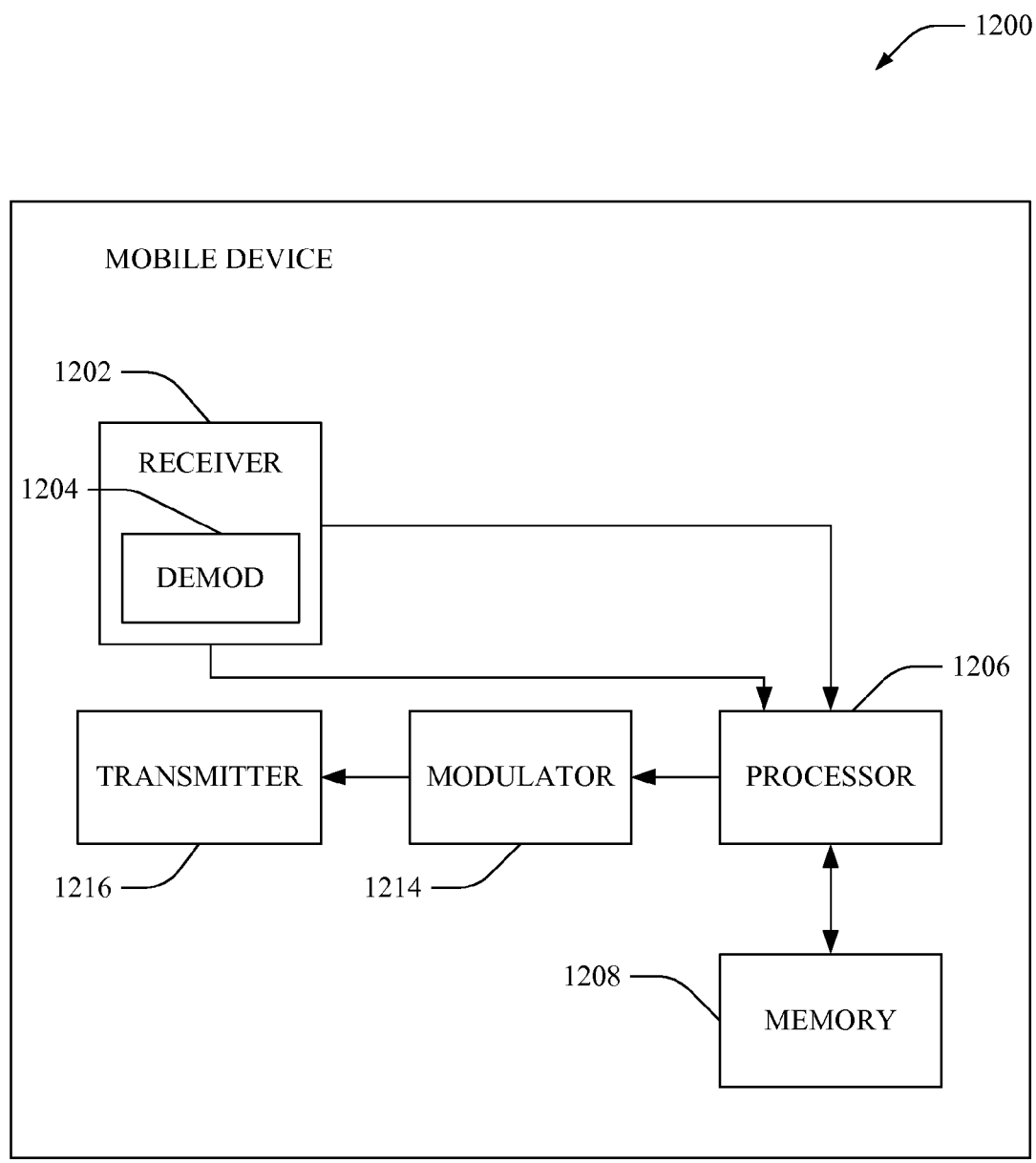
FIG. 12 illustrates a mobile device according to a further aspect of the subject innovation for interaction with a control attachment point(s), during transmission of data in a Coordinated Multipoint (CoMP) system.

FIG. 12 illustrates a mobile device according to a further aspect of the subject innovation for interaction with a control attachment point(s) during transmission of data in a Coordinated Multipoint (CoMP) system. The Mobile device 1200 comprises a receiver 1202 that receives a signal from, for instance, a receive antenna (not shown), and performs typical actions thereon (e.g., filters, amplifies, downconverts, etc.) the received signal and digitizes the conditioned signal to obtain samples. Receiver 1202 can be, for example, an MMSE receiver, and can comprise a demodulator 1204 that can demodulate received symbols and provide them to a processor 1206 for channel estimation. According to an example, receiver 1202 can obtain an advertised signal that follows an identification of a base station thereto. Processor 1206 can be a processor dedicated to analyzing information received by receiver 1202 and/or generating information for transmission by a transmitter 1216, a processor that controls one or more components of mobile device 1200, and/or a processor that both analyzes information received by receiver 1202, generates information for transmission by transmitter 1216, and controls one or more components of mobile device 1200.

Mobile device 1200 can additionally comprise memory 1208 that is operatively coupled to processor 1206 and that can store data to be transmitted, received data, and any other suitable information related to performing the various actions and functions set forth herein. Memory 1208, for instance, can store protocols and/or algorithms associated with analyzing obtained signals related to adapting number of antenna ports that are advertised by a base station in a wireless communication system. Such adaptive feature in determining the number of antenna ports, enables the base station(s) to intelligently balance requirements of legacy UE and new UE (e.g., LTE-A) for an overall efficient operation of the wireless system taken as a whole. Furthermore, memory 1208 can store protocols and/or algorithms associated with balancing performance gain for new users as an offset for performance degradation for legacy users.

It is to be appreciated that the data store (e.g., memory 1208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1208 of the subject systems and methods is intended to comprise, without being limited to, these and any other suitable types of memory. Although depicted as being separate from the processor 1206, it is to be appreciated that the modulator 1214 can be part of processor 1206 or a number of processors (not shown).

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method used in a wireless communication system, comprising:
cooperating among a plurality of cells to exchange joint data packets with a user equipment;
designating a first cell of the plurality of cells as an uplink anchor cell and uplink control attachment point, to manage uplink control signaling with the user equipment; and
designating a second cell of the plurality of cells as a downlink anchor cell and downlink control attachment point, to manage downlink control signaling with the user equipment,
wherein the first cell and second cell are different from each other.

2. The method of claim 1 further comprising sharing of information among the plurality of cells via backhaul transfer of data.

3. The method of claim 2, the sharing of information includes scheduling decisions.

4. The method of claim 3, the plurality of cells jointly or separately determine the scheduling decisions.

5. The method of claim 1 further comprising monitoring control transmission of the user equipment via an auxiliary cell.

6. The method of claim 5, the monitoring further comprising over the air (OTA) monitoring of the user equipment via a soft handoff scenario.

7. The method of claim 6 further comprising negotiating a c-RNTI based acknowledgement.

8. The method of claim 1 further comprising designating a cell with strongest signal as an anchor cell.

9. The method of claim 1 further comprising employing current load of control data as a criteria for designating the cell as an anchor cell.

10. The method of claim 1 further comprising verifying satisfaction of a threshold that defines a criterion for the designating.

11. The method of claim 1 further comprising performing a hand off for an anchor cell from an initial cell to a subsequent cell.

12. The method of claim 1 further comprising estimating interference for a cell.

13. An electronic device configured to execute the method of claim 1.

14. A wireless communications apparatus, comprising:
at least one processor configured to perform at least the following operations:
enabling cooperation among a plurality of cells to exchange joint data packets with a user equipment;
designating a first cell of the plurality of cells as an uplink anchor cell and uplink control attachment point, to manage uplink control signaling with the user equipment;
designating a second cell of the plurality of cells as a downlink anchor cell and downlink control attachment point, to manage downlink control signaling with the user equipment,
wherein the first and second cells are different from each other.

15. The wireless communication apparatus of claim 14, wherein the at least one processor is further configured to enable sharing information among the plurality of cells via backhaul transfer of data.

16. The wireless communication apparatus of claim 14, wherein the at least one processor is further configured to enable monitoring control transmission of the user equipment via an auxiliary cell.

17. The wireless communication apparatus of claim 16, the monitoring further comprising over the air (OTA) monitoring of the user equipment via a soft handoff scenario.

18. The wireless communication apparatus of claim 17, wherein the at least one processor is further configured to perform negotiating a c-RNTI based acknowledgement.

19. The wireless communication apparatus of claim 14, wherein the at least one processor is further configured to perform handing off an anchor cell from an initial cell to a subsequent cell.

20. The wireless communication apparatus of claim 14, wherein the at least one processor is further configured to perform designating a cell with strongest signal as an anchor cell.

21. The wireless communication apparatus of claim 14, wherein the at least one processor is further configured to perform verifying satisfaction of a threshold that defines a criteria for the designating the cell as an anchor cell.

22. The wireless communication apparatus of claim 14, wherein the at least one processor is further configured to estimate interference for a cell.

23. An apparatus, comprising:
means for enabling cooperation among a plurality of cells to exchange joint data packets with a user equipment; and
designating means for:
 designating a first cell of the plurality of cells as an uplink anchor cell and uplink control attachment point, to manage uplink control signaling with the user equipment; and
 designating a second cell of the plurality of cells as a downlink anchor cell and downlink control attachment point, to manage downlink control signaling with the user equipment;
 wherein the first and second cells are different from each other.

24. The apparatus of claim 23 further comprising means for exchanging information among the plurality of cells via backhaul transfer of data.

25. The apparatus of claim 23 further comprising means for verifying satisfaction of threshold values related to criteria for designating the cell as an anchor cell.

26. The apparatus of claim 23, the plurality of cells can jointly or separately determine scheduling decisions.

27. The apparatus of claim 23 further comprising means for monitoring control transmission of the user equipment via an auxiliary cell.

28. The apparatus of claim 27, the means for monitoring control transmission of the user equipment employs over the air (OTA) monitoring of the user equipment via a soft handoff scenario.

29. The apparatus of claim 28, the means for monitoring control transmission of the user equipment employs negotiating a c-RNTI based acknowledgement.

30. The apparatus of claim 23, the designating means designates a cell with strongest signal as an anchor cell.

31. A computer program product, comprising:
a non-transitory computer-readable medium comprising:
 code for enabling cooperation among a plurality of cells to exchange joint data packets with a user equipment;
 code for designating a first cell of the plurality of cells as an uplink anchor cell and uplink control attachment point, to manage uplink control signaling with the user equipment; and
 code for designating a second cell of the plurality of cells as a downlink anchor cell and downlink control attachment point, to manage downling control signaling with the user equipment;
 wherein the first and second cells are different from each other.

32. The computer program product of claim 31 further comprising code for sharing information among the plurality of cells via backhaul transfer of data.

33. The computer program product of claim 31 further comprising code for monitoring control transmission of the user equipment via an auxiliary cell.

34. The computer program product of claim 31 further comprising code for negotiating a c-RNTI based acknowledgement.

35. The computer program product of claim 31 further comprising code for handing off an anchor cell from an initial cell to a subsequent cell.

36. The computer program product of claim 35 further comprising code for mitigating a requirement for a fast handoff.

37. The computer program product of claim 35 further comprising code for designating a cell with strongest signal as an anchor cell.

38. The computer program product of claim 35 further comprising code for verifying satisfaction of a threshold that defines a criteria for the designating.

* * * * *